UNITED STATES PATENT OFFICE.

JACOB S. ROBESON, OF CAMDEN, NEW JERSEY, ASSIGNOR TO ROBESON PROCESS COMPANY, OF CAMDEN, NEW JERSEY, A CORPORATION OF NEW JERSEY.

BRIQUET AND PROCESS OF MAKING THE SAME.

No. 841,718.  Specification of Letters Patent.  Patented Jan. 22, 1907.

Application filed June 9, 1906. Serial No. 320,991.

*To all whom it may concern:*

Be it known that I, JACOB S. ROBESON, a citizen of the United States, and a resident of Camden, Camden county, New Jersey, have invented certain Improvements in Briquets and Processes of Making the Same, of which the following is a specification.

My invention relates to the manufacture of briquets from inorganic material, notably the ores of the various metals, particularly iron ore, and all forms of carbonaceous fuel. In the manufacture of these briquets it is absolutely essential that the resultant product shall be non-hygroscopic and at the same time of such density as to maintain its original shape and weight after manufacture.

My invention consists, broadly, of a briquet of inorganic material bonded with a compound comprising waste sulfite liquor and wood-tar, and the specific embodiment of my invention is a briquet of iron ore bonded by such material and afterward subjected to a temperature of about 500° Fahrenheit, whereby it is hardened and at the same time one-half of the sulfur content of the binder is driven off.

My invention comprises, further, the method or process of making this improved composition of matter.

The bonding agent consists of an improved compound comprising a mass of sulfite liquor and "wood-tar" or "pitch," as the material particularly from coniferous woods is sometimes called. By the term "wood-tar" (or "pitch") is meant the heavy liquid residue from the condensed products of the destructive distillation of woody tissues in the manufacture of pyroligneous acid and methyl alcohol, &c.

In the manufacture of cellulose or paper-pulp under what is known as the "sulfite process," which consists in boiling wood and other fibers under pressure in a solution containing sulfurous acid and a base, such as lime or magnesia, a vast quantity of a watery mixture known as "waste sulfite liquor" is produced that hitherto has had little value, besides being highly objectionable in a number of ways and very difficult of disposal. In preparing the compound for use in carrying the method or process of my present invention into effect I employ a concentrated or evaporated solution of the same, preferring to use a neutral undecomposed and concentrated mass of this waste liquor made in accordance with a method I have developed for utilizing such material. In my Patent No. 833,634, dated October 16, 1906, I have set forth a process of treating this raw waste liquor by rendering it substantially neutral with the aid of milk of lime or other suitable alkaline material and then quickly concentrating such neutralized body *in vacuo* without decomposition to a desirable density. In the preferred method or process of making my improved binding agent I propose to use this substantially neutral, undecomposed, and concentrated mass of sulfite liquor made in accordance with the process above set forth, and to a quantity of this liquor at a density of about 30° Baumé I add the same quantity, by volume, of wood-tar of substantially the same density. In practice I have found that the emulsion formed by this combination of the neutral and concentrated waste sulfite liquor and the waste product commonly known as "wood-tar" produced a composition of matter having adhesive properties of a high degree and possesses the further characteristic of being non-hygroscopic, rendering it highly valuable for use as a binder in the briqueting of all forms of inorganic mineral matter, notably the ores of the various metals, particularly iron ore, and all forms of carbonaceous fuel.

I may add the wood-tar at the same density as the concentrated sulfite liquor, which compound thus formed is ready for practical use or may, if desired for any purpose, be subsequently reduced in density for practical use by the addition of an aqueous liquid, or a combination of the ingredients may be made in a relatively thin condition in which the material may under some circumstance be employed. For many purposes the density may be reduced by heat, and this will permit a better admixture with the material to be briqueted.

The combined mixture is preferably subjected to the action of heat to insure the intimate and complete admixture of the ingredients thereof, although substantially satisfactory results can be secured by mixing the ingredients at ordinary temperatures.

In preparing the ore or other inorganic material for briqueting a relatively small portion of the binding compound is mixed therewith. The quantity will depend entirely upon the material operated upon, and, as may be well understood, fuel of a bituminous character will require a smaller proportion of the binder than other forms of inorganic material—iron ore, for instance. In practice I have had satisfactory results with a mixture of about ninety-seven and one-half per cent. of iron ore, preferably in a finely-divided state, and about two and one-half per cent. of the binding agent.

As my improved binding agent carries a small amount of sulfur, which in the case of iron-ore briquets would injuriously affect the finished iron, I heat such briquets after they have left the shaping-press to a temperature not less than 500° Fahrenheit, which action has the effect of hardening the same, and at the same time drives off fully one-half of the sulfur content of the binder.

I claim—

1. As a new article of manufacture, a briquet of inorganic material, bonded by a composition of matter consisting of sulfite liquor, and the liquid residue from the destructive distillation of woody tissue.

2. As a new article of manufacture, a briquet of inorganic material, bonded by a composition of matter consisting of sulfite liquor and wood-tar.

3. As a new article of manufacture, a briquet of inorganic material, bonded by a composition of matter consisting of concentrated sulfite liquor, and the liquid residue from the destructive distillation of woody tissue.

4. As a new article of manufacture, a briquet of inorganic material, bonded by a composition of matter consisting of concentrated sulfite liquor and wood-tar.

5. As a new article of manufacture, an iron ore briquet, bonded by a composition of matter consisting of sulfite liquor, and the liquid residue from the destructive distillation of woody tissue.

6. As a new article of manufacture, an iron ore briquet, bonded by a composition of matter consisting of sulfite liquor and wood-tar.

7. As a new article of manufacture, an iron ore briquet, bonded by a composition of matter consisting of concentrated sulfite liquor, and the liquid residue from the destructive distillation of woody tissue.

8. As a new article of manufacture, an iron ore briquet, bonded by a composition of matter consisting of concentrated sulfite liquor and wood-tar.

9. The process of making briquets of inorganic material, which consists in mixing the material to form the briquets with a binder comprising sulfite liquor and the liquid residue from the destructive distillation of woody tissue, and then subjecting such material to pressure to form the desired shapes or masses.

10. The process of making briquets of inorganic material, which consists in mixing the material to form the briquets with a binder comprising sulfite liquor and wood-tar in a heated condition, and then subjecting such material to pressure to form the desired shapes or masses.

11. The process of making ore briquets, which consists in mixing the ore with a binder comprising sulfite liquor and the liquid residue from the destructive distillation of woody tissue, subjecting such material to pressure to form the desired shapes or masses, and then heating said briquets to a degree sufficient to expel a portion of the sulfur carried by the bonding agent.

12. The process of making ore briquets, which consists in mixing the ore with a binder comprising sulfite liquor and wood-tar in a heated condition, subjecting such material to pressure to form the desired shapes or masses, and then heating said briquet to a degree sufficient to expel a portion of the sulfur carried by the bonding agent.

13. The process of making briquets of inorganic material, which consists in mixing the material to form the briquets with a binder comprising concentrated sulfite liquor and the liquid residue from the destructive distillation of woody tissue, and then subjecting such material to pressure to form the desired shapes or masses.

14. The process of making briquets of inorganic material, which consists in mixing the material to form the briquets with a binder comprising concentrated sulfite liquor and wood-tar in a heated condition, and then subjecting such material to pressure to form the desired shapes or masses.

15. The process of making ore briquets, which consists in mixing the ore with a binder comprising concentrated sulfite liquor and the liquid residue from the destructive distillation of woody tissue, subjecting such material to pressure to form the desired shapes or masses, and then heating said briquet to a degree sufficient to expel a portion of the sulfur carried by the bonding agent.

16. The process of making ore briquets, which consists in mixing the ore with a binder comprising concentrated sulfite liquor and wood-tar in a heated condition, subjecting such material to pressure to form the desired shapes or masses, and then heating said briquet to a degree sufficient to expel a portion of the sulfur carried by the bonding agent.

In testimony whereof I have signed my name to this specification in the presence of two subscribing witnesses.

JACOB S. ROBESON.

Witnesses:
 MURRAY C. BOYER,
 JOS. H. KLEIN.